United States Patent
Hunt et al.

(10) Patent No.: US 6,924,925 B2
(45) Date of Patent: Aug. 2, 2005

(54) STIMULATED POLARITON SCATTERING OPTICAL AMPLIFIER

(75) Inventors: Jeffrey H. Hunt, Chatsworth, CA (US); Robert J. Atmur, Whittier, CA (US)

(73) Assignee: The Boeing Company

( * ) Notice: Subject to any disclaimer, the term of this patent is extended or adjusted under 35 U.S.C. 154(b) by 328 days.

(21) Appl. No.: 10/360,286

(22) Filed: Feb. 7, 2003

(65) Prior Publication Data

US 2004/0156091 A1 Aug. 12, 2004

(51) Int. Cl.$^7$ ................................................. H01S 3/00
(52) U.S. Cl. ...................................................... 359/333
(58) Field of Search ................................. 359/333, 334; 372/39; 398/212

(56) References Cited

U.S. PATENT DOCUMENTS

| | | | |
|---|---|---|---|
| 3,414,354 A | 12/1968 | Siegler | |
| 3,515,897 A | 6/1970 | Culver | |
| 6,344,921 B1 * | 2/2002 | Galvanauskas et al. | 359/332 |
| 6,697,186 B2 * | 2/2004 | Kawase et al. | 359/330 |
| 6,850,359 B2 * | 2/2005 | Hunt et al. | 359/333 |

FOREIGN PATENT DOCUMENTS

| | | | |
|---|---|---|---|
| JP | 402106726 A | * | 4/1990 |
| JP | 02000131725 A | * | 5/2000 |

OTHER PUBLICATIONS

J.J. Hopfield, *Theory of the Contribution of Excitons to the Complex Dielectric Constant of Crystals*, Physical Review, vol. 112, No. 5, pp. 1555–1567, Dec. 1, 1958.

Y.R. Shen, *Theory of Stimulated Raman Effect. II*, Physical Review, vol. 138, No. 6A, pp. A1741–A1746, Jun. 14, 1965.

C.H. Henry et al., *Theory of Parametric Gain Near a Lattice Resonance*, Physical Review, vol. 171, No. 3, pp. 1058–1064, Jul. 15, 1968.

J.M. Yarborough et al., *Efficient, Tunable Optical Emission from $LiNbO_3$ Without a Resonator*, Applied Physics Letters, vol. 15, No. 3, pp. 162–165, Aug. 1, 1969.

Y. R. Shen, *The Principles of Nonlinear Optics*, University of California, Berkeley, pp. 187–195, ISBN 0-471-88998-9, 1984.

* cited by examiner

*Primary Examiner*—Mark Hellner

(57) ABSTRACT

The stimulated polariton scattering optical amplifier includes a first control optics assembly, a driver element, a second control optics assembly, a polariton active medium and egressing optics. The first control optics assembly receives an incoming laser beam and adjusts that incoming laser beam in accordance with first desired wavelength, polarization and beam propagation parameters. A driver element produces a driver laser beam. A second control optics assembly receives the driver laser beam and adjusts that driver laser beam in accordance with second desired wavelength, polarization and beam propagation parameters. A polariton active medium receives an output from the first control optics assembly and an output from the second control optics assembly. The polariton active medium provides a non-linear optical interaction between the outputs such that the incoming laser beam is amplified, producing an amplified polariton active medium output laser beam and a depleted driver laser beam. Egressing optics receives the amplified polariton active medium output laser beam and the depleted driver laser beam. The egressing optics controllably transmits the amplified polariton active medium output laser beam in accordance with third desired wavelength, polarization, and beam propagation parameters and prevents transmission of the depleted driver laser beam. The output of the egressing optics includes an amplified egressing optics output laser beam.

27 Claims, 2 Drawing Sheets

STIMULATED POLARITON SCATTERING OPTICAL AMPLIFIER

BACKGROUND OF THE INVENTION

1. Field of the Invention

This invention relates to optical amplifiers and more particularly to an optical amplifier that uses stimulated polariton scattering for providing optical amplification.

2. Description of the Related Art

Heretofore, the field of optical signal amplifiers has been dominated by Raman amplifiers. For example, U.S. Pat. No. 3,414,354, issued to E. H. Siegler Jr., entitled Raman Spectrometers, is a seminal publication disclosing the use of stimulated Raman scattering, to provide optical amplification. In a later example, U.S. Pat. No. 3,515,897, issued to W. H. Culver, entitled Stimulated Raman Parametric Amplifier, discloses a design for implementing stimulated Raman scattering for amplification. In Physical Review 112, p. 1555–1567 (1958), J. J. Hopfield discusses the effect of exciton absorption on the dielectric response within a crystal. This affects the crystal polariton behavior. The date of the Hopfield paper precedes the first laser demonstration and does not address the stimulated optical response. In Phys Rev 138, p. A1741-A1746 (1965), Y. R. Shen delineates a clear theoretical model for the Raman effect in polar media, an effect closely related to that associated with stimulated polariton scattering. His paper deals strictly with the physical interaction and does not describe applications of the physics. In Physical Review 171 p. 1058–1064 (1968), C. H. Henry et. al. discuss the physical analysis of parametric gain associated with polaritons. They do not address the use of the parametric gain for amplifying a signal. In Applied Physics Letters 15, p. 102–105 (1969), J. M. Yarborough shows how Raman scattering in a polar medium can be used to parametrically generate tunable infrared radiation. In this case, the polar medium is $LiNbO_3$, but there is mention of signal amplification.

Use of Raman scattering for optical signal amplification has limitations in its operation and implementation. Examination of the equations that govern stimulated Raman scattering break down into two terms. The first term is associated with the wave that is being amplified, also known as the Stokes wave. The second term is associated with a material excitation that is a product of the Raman scattering. Consequently, stimulated Raman scattering can be considered as a parametric or coupled generation process in which the optical pump wave generates a Stokes wave (i.e. the amplified input) and a material excitation wave. This material excitation wave is part of the coupled wave physical process which allows the input beam to be amplified. The frequency of the material excitation is set by the material in use. This excitation cannot vary, as it arises from a vibrational state that is both infrared and Raman active. The material excitation frequency imposes a strict frequency relation between the pump and input beams. In many applications, either the input or pump is set by other technical requirements, such as optical power or frequency compatibility, which severely limits the flexibility of the amplifier.

SUMMARY

In a broad aspect, the stimulated polariton scattering optical amplifier of the present invention includes a first control optics assembly, a driver element, a second control optics assembly, a polariton active medium and egressing optics. The first control optics assembly receives an incoming laser beam and adjusts that incoming laser beam in accordance with first desired wavelength, polarization and beam propagation parameters. A driver element produces a driver laser beam. A second control optics assembly receives the driver laser beam and adjusts that driver laser beam in accordance with second desired wavelength, polarization and beam propagation parameters. A polariton active medium receives an output from the first control optics assembly and an output from the second control optics assembly. The polariton active medium provides a nonlinear optical interaction between the outputs such that the incoming laser beam is amplified producing an amplified polariton active medium output laser beam and a depleted driver laser beam. Egressing optics receives the amplified polariton active medium output laser beam and the depleted driver laser beam. The egressing optics controllably transmits the amplified polariton active medium output laser beam in accordance with third desired wavelength, polarization and beam propagation parameters and prevents transmission of the depleted driver laser beam. The output of the egressing optics includes an amplified egressing optics output laser beam.

The use of polariton scattering allows parametric amplification of a weak signal without the strict signal frequency versus pump frequency constraints associated with Raman scattering. This improves the technical flexibility of the overall system allowing more options for its implementation. This has the potential to offer simpler optical designs than that associated with the Raman process. As a result, the hardware associated with the use of this amplifier in an optical system, such as an optical communication system, minimizes volume and weight.

DETAILED DESCRIPTION OF THE INVENTION

Figure 1:
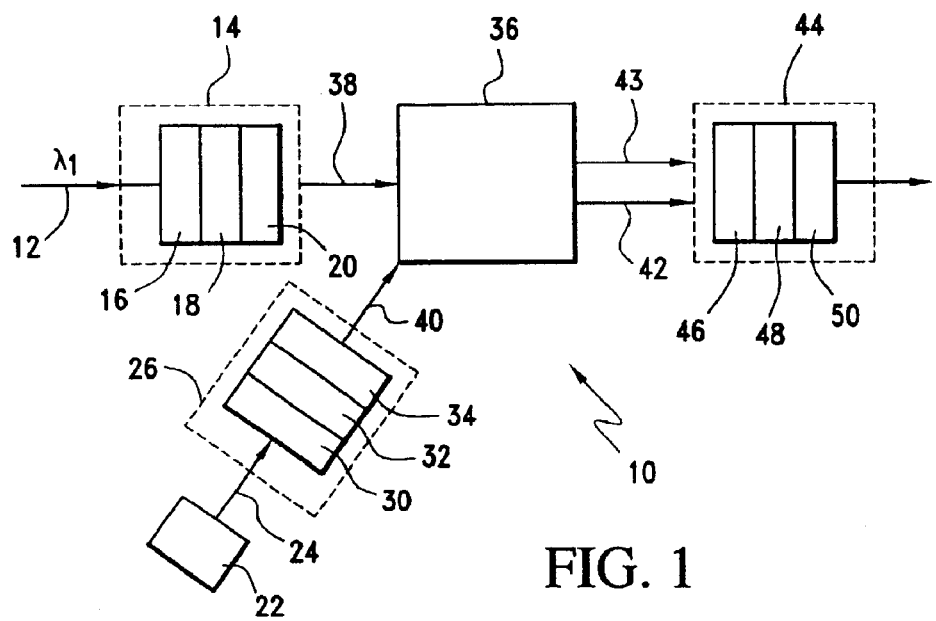
FIG. 1 is a schematic view of a preferred embodiment of the stimulated polariton scattering optical amplifier of the present invention.

Referring to the drawings and the characters of reference marked thereon, FIG. 1 illustrates a preferred embodiment of the present invention, designated generally as 10. An incoming laser beam 12 is received by a first control optics assembly, designated generally as 14. The laser beam, $\lambda_1$, may be generally described as an electromagnetic or light beam with a single narrow wavelength in the optical regime (0.1–10 microns), which is propagating in a uniform well-defined direction, made possible by its coherence properties. The laser beam could represent an image or could be a digitally encoded optical beam for data transmission.

The first control optics assembly 14 adjusts the incoming laser beam in accordance with desired wavelength, polarization and beam propagation parameters. These parameters can include, for example, precise wavelength filtering to the expected signal wavelength, the optical bandwidth of the incoming signal or the polarization of the light. The wavelength may be controlled to fit within the transparency range of the ensuing steerer. It may be more precisely filtered to fit a known input signal, either from an image or from a digitally encoded communication beam.

The assembly 14 preferably includes a wavelength control element 16 such as a color filter, an etalon, a Fabry-Perot interferometer, a Fizeau interferometer, a diffraction grating, or a notch filter, etc. A polarization control element 18 polarizes the wavefront. This may comprise, for example, a polarization plate, a Brewster's angle polarizer, or a thin film polarizer. The precise polarizer to be selected depends on the particular application's engineering requirements such as polarization rejection ratio, size and weight of the polarizer, and the wavelength range over which the steerer must operate, etc. The wavefront is then received by a propagation control element 20 such as a single lens, double lens, refractive elements, reflective elements or other system up to a fully engineered telescope.

A driver element 22, for encoding, produces a driver laser beam 24. The driver element 22 may comprise, for example, a single frequency laser, with sufficiently high intensity to affect a nonlinear optical interaction with the incoming beam described previously. This could be a solid state laser, a high power diode laser or other suitable high intensity laser.

A second control optics assembly 26 adjusts the driver laser beam 24 in accordance with desired wavelength, polarization and beam propagation parameters. The assembly 26 preferably includes wavelength control element 30, such as a color filter, an etalon, a Fabry-Perot interferometer, a Fizeau interferometer, a diffraction grating or a notch filter. A polarization control element 32 and a propagation control element 34 are utilized, as described above.

A polariton active medium 36 receives an output 38 from the first control optics assembly 14 and an output 40 from the second control optics assembly 26. The polariton active medium 36 provides a non-linear optical interaction between the outputs 38, 40 such that an amplified polariton active medium output laser beam 42 and a depleted driver laser beam 43 are provided. Using stimulated polariton scattering as a means of amplification provides enhanced flexibility in the amplification process. In this process, as in all stimulated processes, there is a material excitation present as the physical entity that couples the pump and signal waves. However, in this case, the excitation is a polariton. A polariton is a mixed excitation wave process associated with certain condensed matter, specifically, polar crystals. The excitational wave is a mix between infrared and phonon waves. The polariton wave does not oscillate at a specific frequency. Instead, it has a dispersion curve, giving a relation between frequency and wavevector.

Figure 2:
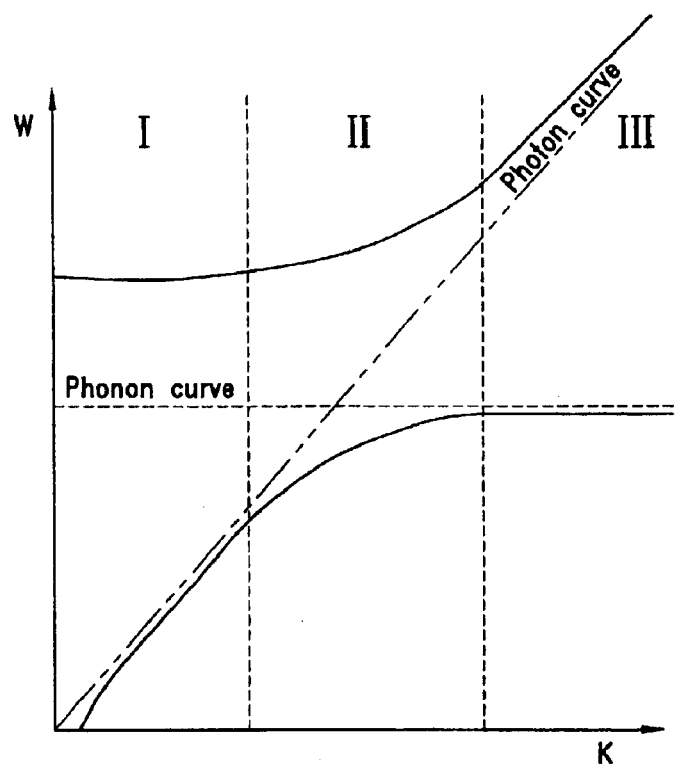
FIG. 2 shows a dispersion curve for a polariton, providing a relation between frequency and wavevector.

This dispersion curve is shown as FIG. 2. The solid lines represent the dispersion curve for the polariton. The dispersion breaks into three regions. In region I, there is a small K (wavevector) value. Here, the dispersion shows the high frequency branch with phonon-like dispersion and the low frequency branch with photon-like dispersion. Since there is clear distinction between the two, this region yields little stimulated polariton amplification. Similarly, in region III, there is a large K value. Here, the high frequency branch exhibits photon-like dispersions and the low frequency branch exhibits phonon-like dispersion. Analogously to region I, there is little stimulated polariton amplification. In region II, there is strong $\omega$ versus K dispersion. Consequently, this medium K value region shows strong coupling between the upper and lower frequency branches. As a result, this is the K region which will exhibit the strongest polariton parametric amplification.

The frequency condition is given by $\omega_l = \omega_s + \omega_p$, where $\omega_l$ is the frequency of the pump laser, $\omega_s$ is the frequency of the input laser and $\omega_p$ is the frequency of the polariton. The wavevector matching conditions are $k_l = k_s + k_p$, where $k_l$ is the wavevector of the pump laser, $k_s$ is the wavevector of the input laser and $k_p$ is the wavevector of the polariton. As a result, the frequency of the polariton will depend on the scattering angle, as that angle will control the wavevector matching. Consequently, different propagation angles can be used to match different pump and signal frequencies. Furthermore, growth techniques of polar crystals have matured greatly during the last ten years. By controlling the crystal growth, custom materials can be grown to operate over a range of frequencies, with the crystal engineered to match the optical conditions desired. The polariton active medium preferably operates in a frequency range of about 50–300 $cm^{-1}$.

The gain coefficient for the stimulated polariton process is given in Chapter 10 of Principles of Nonlinear Optics by Y. R. Shen. Quoted here, the gain coefficient, $G_p$, is given by $$G_P = \frac{8\pi^2 \omega_s^s \omega_P^2}{c^2 k_{sz} k_{Pz}} (\chi_{\mathit{eff}}^{(2)})^2 |\mathcal{E}_1|^2,$$

where $\omega_s$ is the input frequency, $\omega_p$ is the polariton frequency, $k_{sz}$ is the input wavevector component in the gain direction, $k_{pz}$ is the polariton wavevector component in the gain direction, c is the speed of light, $\chi_{\mathit{eff}}^{(2)}$ is the effective second order polariton susceptibility, and $|E_l|$ is the absolute magnitude of the pump laser.

The driver output 40 enters the polariton active medium 36 along with the weak beam 38 whose intensity is to be amplified. As the polariton has both infrared and phonon properties, the coupling parameters contains both second and third order contributions. Consequently, via both coupled wave $\chi^{(2)}$ and $\chi^{(3)}$ processes, energy is transferred from the pump or driver beam 43 to the weak beam 38. The material excitation present, as the physical entity that couples the pump and signal waves, is a polariton wave. A typical frequency shift associated with a polariton event is tunable and can range from 25 $cm^{-1}$ to 300 $cm^{-1}$. The physical process that leads to the growth of the acoustic wave also leads to the growth of the weak beam 38, as the wave processes are coupled.

Examples of polariton active media are condensed matter polar crystals. Examples of these include GaP and $LiNbO_3$. Other manufactured nonlinear media, such as periodically poled $LiNbO_3$ or periodically poled KDP, are also candidates for this amplification media. This could also be extended to fiber optical materials that are capable of supporting the formation and propagation of polariton excitations. Such materials allow good efficiency in the nonlinear optical interaction.

Egressing optics 44 receives the output 42 of the polariton active medium 36 and adjusts that laser beam in accordance with desired wavelength, polarization and beam propagation parameters. The output of the egressing optics has the laser beam propagation direction shifted relative to the incoming laser beam direction. Egressing optics 44 includes an egressing wavelength control element 46, an egressing propagation control element 48 and an egressing polarization control element 50. These components may be as discussed above with respect to assemblies 14 and 26.

Figure 3:
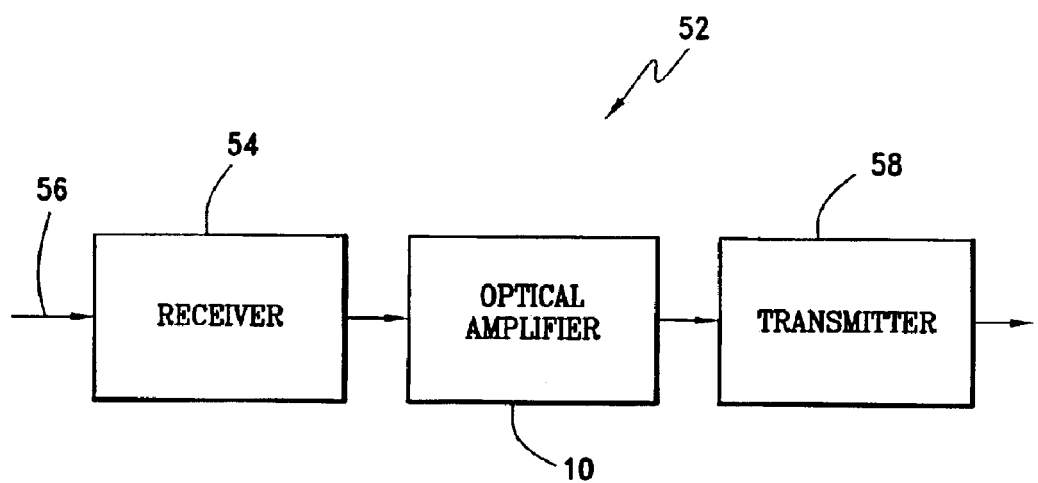
FIG. 3 is a schematic view of a communication system implementing a stimulated polariton scattering optical amplifier in accordance with the principles of the present invention.

Referring now to FIG. 3, integration of the stimulated polariton scattering optical amplifier 10 of the present invention is illustrated into an optical communication system, designated generally as 52. The communication system 52 includes an optical receiver 54 that receives a relatively weak signal 56 entering via, for example, a fiber or free space. The receiver 54 may be, for example, a telescope or commercially available fiber terminator for collecting a free space propagated signal or fiber optically propagated signal, respectively. The optics associated with the receiver will be a combination of refractive or reflective elements which couple the weak input into the amplifier stage. The optical amplifier 10 receives the output from the receiver 54 and provides an output to an optical transmitter 58. The optical transmitter 58 may typically be a telescope, if free space, or fiber launcher for fiber optic based propagation. The optics associated with the transmitter is a suitable a combination of refractive or reflective elements which couple the amplified signal from the amplifier stage.

The optical communication system may be used for a number of applications. For example, it may be an optical repeater for a telecommunication system, a long distance internet communication system or short haul distribution system for connecting to individual users.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

What is claimed is:

1. A stimulated polariton scattering optical amplifier, comprising:
   a) a first control optics assembly for receiving an incoming laser beam and adjusting that incoming laser beam in accordance with first desired wavelength, polarization and beam propagation parameters;
   b) a driver element for producing a driver laser beam;
   c) a second control optics assembly for receiving said driver laser beam and adjusting that driver laser beam in accordance with second desired wavelength, polarization and beam propagation parameters;
   d) a polariton active medium for receiving an output from the first control optics assembly and an output from the second control optics assembly, said polariton active medium providing a non-linear optical interaction between said outputs such that the incoming laser beam is amplified, producing an amplified polariton active medium output laser beam and a depleted driver laser beam; and,
   e) egressing optics for receiving said amplified polariton active medium output laser beam and said depleted driver laser beam, said egressing optics for controllably transmitting said amplified polariton active medium output laser beam in accordance with third desired wavelength, polarization and beam propagation parameters and preventing transmission of said depleted driver laser beam, the output of said egressing optics comprising an amplified egressing optics output laser beam.

2. The optical amplifier of claim 1, wherein said first control optics assembly, comprises:
   a first set of serially positioned control elements for receiving the incoming laser beam, said first set of control elements comprising a first wavelength control element, a first propagation control element and a first polarization control element, said first set of control elements providing an first control optics assembly output to said polariton active medium.

3. The optical amplifier of claim 1, wherein said first control optics assembly, comprises:
   a first set of serially positioned control elements for receiving the incoming laser beam, said first set of control elements comprising a first wavelength control element, a first propagation control element and a first polarization control element, said first set of control elements providing an first control optics assembly output to said polariton active medium.

4. The optical amplifier of claim 1, wherein said polariton active medium comprises condensed matter polar crystals.

5. The optical amplifier of claim 1, wherein said polariton active medium comprises GaP.

6. The optical amplifier of claim 1, wherein said polariton active medium comprises $LiNbO_3$.

7. The optical amplifier of claim 1, wherein said polariton active medium comprises periodically poled GaP.

8. The optical amplifier of claim 1, wherein said polariton active medium comprises periodically poled $LiNbO_3$.

9. The optical amplifier of claim 1, wherein said polariton active medium comprises fiber optical material.

10. The optical amplifier of claim 1, wherein said polariton active medium possesses a frequency shift in a range of about $25-300$ $cm^{-1}$.

11. An optical communication system, comprising:
   a) an optical receiver for receiving an incoming laser beam and providing a receiver output;
   b) a stimulated scattering optical amplifier, comprising:
      i) a first control optics assembly for receiving said receiver output and adjusting that receiver output in accordance with first desired wavelength, polarization and beam propagation parameters;
      ii) a driver element for producing a driver laser beam;
      iii) a second control optics assembly for receiving said driver laser beam and adjusting that driver laser beam in accordance with second desired wavelength, polarization and beam propagation parameters;
      iv) a polariton active medium for receiving an output from the first control optics assembly and an output from the second control optics assembly, said polariton active medium providing a non-linear optical interaction between said outputs such that the incoming laser beam is amplified producing an amplified polariton active medium output laser beam and a depleted driver laser beam; and
      v) egressing optics for receiving said amplified polariton active medium output laser beam and said depleted driver laser beam, said egressing optics for controllably transmitting said amplified polariton active medium output laser beam in accordance with third desired wavelength, polarization, and beam propagation parameters and preventing transmission of said depleted driver laser beam, the output of said egressing optics comprising an amplified egressing optics output laser beam; and,
   c) a transmitter for receiving said egressing optics output laser beam and providing a transmitter output.

12. The optical communication system of claim 11, wherein said polariton active medium comprises condensed matter polar crystals.

13. The optical communication system of claim 11, wherein said polariton active medium comprises GaP.

14. The optical communication system of claim 11, wherein said polariton active medium comprises $LiNbO_3$.

15. The optical communication system of claim 11, wherein said polariton active medium comprises periodically poled GaP.

16. The optical communication system of claim 11, wherein said polariton active medium comprises periodically poled $LiNbO_3$.

17. The optical communication system of claim 11, wherein said polariton active medium comprises fiber optical material.

18. The optical communication system of claim 11, wherein said polariton active medium possesses a frequency shift in a range of about 25–300 $cm^{-1}$.

19. A method for amplifying a laser beam comprising the steps of:
   a) adjusting an incoming laser beam in accordance with first desired wavelength, polarization and beam propagation parameters;
   b) producing a driver laser beam;
   c) adjusting said driver laser beam in accordance with second desired wavelength, polarization and beam propagation parameters;
   d) utilizing a polariton active medium for receiving the adjusted incoming laser beam and said adjusted driver laser beam, said polariton active medium providing a non-linear optical interaction between said adjusted incoming laser beams such that the incoming laser beam is amplified producing an amplified polariton active medium output laser beam and a depleted driver laser beam; and,
   f) receiving said amplified polariton active medium output laser beam and said depleted driver laser beam, utilizing egressing optics, said egressing optics for controllably transmitting said amplified polariton active medium output laser beam in accordance with third desired wavelength, polarization, and beam propagation parameters and preventing transmission of said depleted driver laser beam, the output of said egressing optics comprising an amplified egressing optics output laser beam.

20. The method of claim 19, wherein said step of adjusting said incoming optical laser beam comprises:

utilizing a first set of serially positioned control elements for receiving the incoming laser beam, said first set of control elements comprising a first wavelength control element, a first propagation control element and a first polarization control element, said first set of control elements providing an output to said driver element.

21. The method of claim 19, wherein said step of adjusting said incoming optical laser beam, comprises:

utilizing a second wavelength control element for receiving the driver optical wavefront; and, utilizing a second propagation control element for receiving the output of the second wavelength control element.

22. The method of claim 19, wherein said step of utilizing a polariton active medium comprises utilizing condensed matter polar crystals.

23. The method of claim 19, wherein said step of utilizing a polariton active medium comprises utilizing GaP.

24. The method of claim 19, wherein said step of utilizing a polariton active medium comprises utilizing $LiNbO_3$.

25. The method of claim 19, wherein said step of utilizing a polariton active medium comprises utilizing periodically poled GaP.

26. The method of claim 19, wherein said step of utilizing a polariton active medium comprises utilizing periodically poled $LiNbO_3$.

27. The method of claim 19, wherein said step of utilizing a polariton active medium comprises utilizing fiber optical material.

* * * * *